(12) United States Patent
Glider

(10) Patent No.: US 7,020,760 B2
(45) Date of Patent: Mar. 28, 2006

(54) HYBRID LOGICAL BLOCK VIRTUALIZATION SYSTEM FOR A STORAGE AREA NETWORK

(75) Inventor: Joseph S. Glider, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/320,318

(22) Filed: Dec. 16, 2002

(65) Prior Publication Data

US 2004/0117585 A1    Jun. 17, 2004

(51) Int. Cl.
*G06F 12/00* (2006.01)

(52) U.S. Cl. .......................... 711/202; 711/4; 711/154; 711/6; 711/111; 711/112

(58) Field of Classification Search ............... 711/202, 711/154, 4, 6, 111, 112
See application file for complete search history.

(56) References Cited

U.S. PATENT DOCUMENTS

| | | |
|---|---|---|
| 5,761,696 A | 6/1998 | Giordano et al. |
| 5,996,054 A | 11/1999 | Ledain et al. |
| 6,101,590 A | 8/2000 | Hansen |
| 6,792,557 B1 * | 9/2004 | Takamoto et al. ............. 714/7 |
| 2002/0019863 A1 | 2/2002 | Reuter et al. |
| 2002/0026558 A1 | 2/2002 | Reuter et al. |
| 2002/0029326 A1 | 3/2002 | Reuter et al. |
| 2002/0112113 A1 | 8/2002 | Karpoff et al. |
| 2003/0177330 A1 * | 9/2003 | Idei et al. ................... 711/202 |

* cited by examiner

*Primary Examiner*—Pierre Bataille
*Assistant Examiner*—Sheng-Jen Tsai
(74) *Attorney, Agent, or Firm*—Gibb I.P. Law Firm, LLC; Edmund H. Mizumoto

(57) ABSTRACT

A method and structure for a system for managing logical blocks of storage is disclosed. An out-of-band mapping unit is adapted to process data requests from a host. The mapping unit includes a first table and a second table. An in-band virtualization engine is operatively connected to the out-of-band mapping unit. The first table is adapted to map to locations on a memory device. The second table is adapted to map to the in-band virtualization engine. The in-band virtualization engine is adapted to perform storage management functions and directly map to the locations on the memory device. The out-of-band mapping unit is adapted to be dynamically altered by the in-band virtualization engine to determine which of the first table and the second table is chosen.

20 Claims, 5 Drawing Sheets

HYBRID LOGICAL BLOCK VIRTUALIZATION SYSTEM FOR A STORAGE AREA NETWORK

BACKGROUND OF THE INVENTION

1. Field of the Invention

The present invention generally relates to shared storage and more particularly to a hybrid virtualization engine which provides a system that has the advantages of both in-band and out-of-band virtualization engines without the disadvantages of either.

2. Description of the Related Art

Until recently, shared storage has only been implemented well within homogeneous aggregations of computer systems, IBM System 390 (IBM Corporation, Armonk, N.Y., USA) is one example where different computers have been able to share storage, this sharing is enabled by the existence of a single architecture that fits together the sharing mechanisms and storage management mechanisms.

With the advent of open systems and especially since the advent of storage area networks (SAN), no single system vendor has been able to define such an architecture or storage management system under which all logical block storage can be deployed and managed. Instead, a set of different vendors have produced different products according to different standards and application program interfaces (APIs). The result of this is that while a large range of hardware products can be physically attached on a SAN fabric, they generally do not interoperate well and they also generally present different interfaces to storage administrators and storage administration tools, making the management of the set of connected logical block devices extremely difficult.

A class of SAN products termed 'virtualization engines' have started to appear. The purpose of this class of product is to significantly simplify the management of logical block storage in the following ways. A virtualization engine places a mapping function in the path in which read and write data requests are made by computer systems. The purpose of the mapping function is to determine which physical storage locations hold the data requested by the computer system, to intercept write data requests and perform special actions when the physical storage locations are sources for advanced functions such as point-in-time or remote copies. To be effective, this mapping function should add only small latency to the fulfillment of the data request, and scale well. Since a SAN attaches many computer systems (possibly from several vendors) with many storage devices (also possibly from several vendors), the mapping function must provide a consistent picture to all computer systems of which physical storage locations are associated with which logical blocks that are being accessed by those computer systems. To date, two virtualization engine architectures have emerged, 'in-band' and 'out-of-band'. Out-of-band virtualization engines have two separate functions which coordinate together to provide virtualization.

The first function is the mapping function, which maps host requests to physical locations on a storage device. There are generally many instances of the mapping function within the SAN. These instances are typically located in a computer system either in a device driver or host bus adapter, or in a SAN switch such as a fibrechannel switch. The mapping function is meant to operate with very low overhead, for example in a fibrechannel switch is meant to operate at the maximum rated speed of the switch.

The second function is the management function, which handles the interface to the system administrator or system administration tool. One responsibility of the management function is to respond to configuration requests by updating the master copy of the configuration and also coordinating the altering of the tables in the various instances of the mapping function to reflect new configuration. Another responsibility is to be responsive to signals from the mapping function instances indicating that data access requests require special handling, and to coordinate the actions for carrying out the special handling. There is generally only one management function in the system albeit with a backup instance of it to provide fault tolerance for the function.

In-band virtualization engines combine the two functions such that read and write data requests are serviced at the same place that configuration requests are serviced. In addition, they often have more advanced functions such as fast-write caching and more robust and performance oriented implementations of remote copy and point-in-time copy.

SUMMARY OF THE INVENTION

There is provided, according to one aspect of the invention, a hybrid virtualization engine which provides a system that has the advantages of both the in-band and out-of-band virtualization engine without the disadvantages of either.

The invention provides a system for managing logical blocks of storage that includes an out-of-band mapping unit that processes data from a host. The mapping unit has a first table and a second table. An in-band virtualization engine is operatively connected to the out-of-band mapping unit. The first table maps locations on a memory device and the second table maps to the in-band virtualization engine. The in-band virtualization engine performs storage management functions and directly maps to the locations on the memory device. The out-of-band mapping unit is dynamically altered by the in-band virtualization engine to determine which of the first table and the second table is chosen.

The out-of-band mapping unit includes a flag (e.g., indicator) for choosing between the first table and the second table. The in-band virtualization engine performs advanced functions including fast-write caching, remote copy, and point-in-time copy. The in-band virtualization engine includes a management unit and a mapping unit that coordinates updates of the first table and the second table of the out-of-band virtualization engines. The in-band virtualization engine processes configuration requests from external administrators and also performs background request processing on the memory device.

The invention provides a method for managing logical blocks of storage which combines both the in-band and out-of-band virtualization engine approaches. The invention processes data from a host using the out-of-band mapping unit. The invention dynamically alters the out-of-band mapping unit using the in-band virtualization engine so as to determine which of the first table and the second table is chosen. The invention performs the storage management functions by using a management unit in the in-band virtualization engine. The direct mapping is performed using a mapping unit in the out-of-band virtualization engine. The invention updates the first table and the second table of the out-of-band virtualization engine using the in-band virtualization engine. The invention processes configuration requests from external administrators using the in-band virtualization engine. The invention performs background request processing on the memory device using the in-band virtualization engine.

Thus, the invention provides the advantages of both the in-band and out-of-band virtualization approaches. Potentially, most of the data requests go through the relatively inexpensive mapping unit of the in-band virtualization engine directly to storage, however for that set of data for which advanced function is required or desired, the data requests could go quickly (rather than through a high latency exception route as in the out-of-band virtualization approach) to the in-band virtualization engine where the advanced function will be carried out in a performance optimized way.

In addition, with the invention, a user can provision this system flexibly to achieve cost goals. For a low cost virtualization system or where the user already has high performance back-end storage (e.g., with fast-write cache), relatively inexpensive out-of-band virtualization engine mapping units could be deployed in most cases whereas relatively few of the in-band virtualization engines might be deployed to handle the management function and the small amount of data requests resulting from advanced functions such as point-in-time copy or remote copy. On the other hand, a user could choose to deploy a significant set of in-band virtualization engines where those engines will then provide high performance fast-write cache for most of the data.

BRIEF DESCRIPTION OF THE DRAWINGS

Aspects and advantages of the invention will be better understood from the following detailed description with reference to the drawings, in which.

DETAILED DESCRIPTION OF PREFERRED EMBODIMENTS OF THE INVENTION

Figure 1:
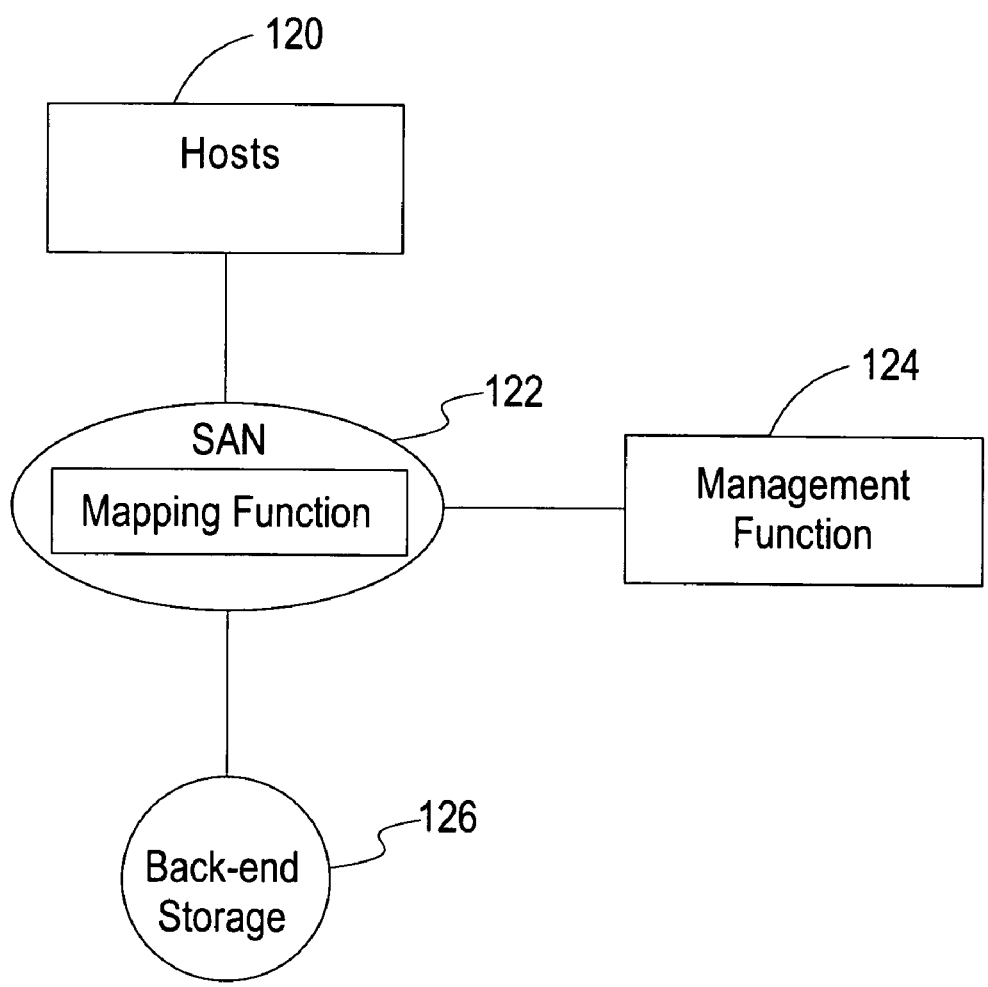
FIG. 1 is a schematic diagram of an out-of-band virtualization engine.

Two virtualization engine architectures ('in-band' and 'out-of-band') are first discussed herein. The out-of-band virtualization engine in FIG. 1, for example, has two separate functions which coordinate together to provide virtualization. The first function is a mapping unit (function) 122, which maps host 120 requests to physical locations on a storage device. There are generally many instances of the mapping unit 122 within the SAN. These instances are typically located in a computer system either in a device driver or host bus adapter, or in a SAN switch such as a fibrechannel switch. The mapping unit is meant to operate with very low overhead, for example, a fibrechannel switch is meant to operate at the maximum rated speed of the switch. The second unit is the management unit (function) 124, which handles the interface to the system administrator or system administration tool.

One responsibility of the management unit 124 is to respond to configuration requests by updating the master copy of the configuration and also coordinating the altering of the tables in the various instances of the mapping unit to reflect a new configuration. Another responsibility is to be responsive to signals from the mapping unit 122 instances indicating that data access requests require special handling, and to coordinate the actions for carrying out the special handling. There is generally only one management unit 124 in the system albeit with a backup instance of it to provide fault tolerance for the function.

Figure 2:
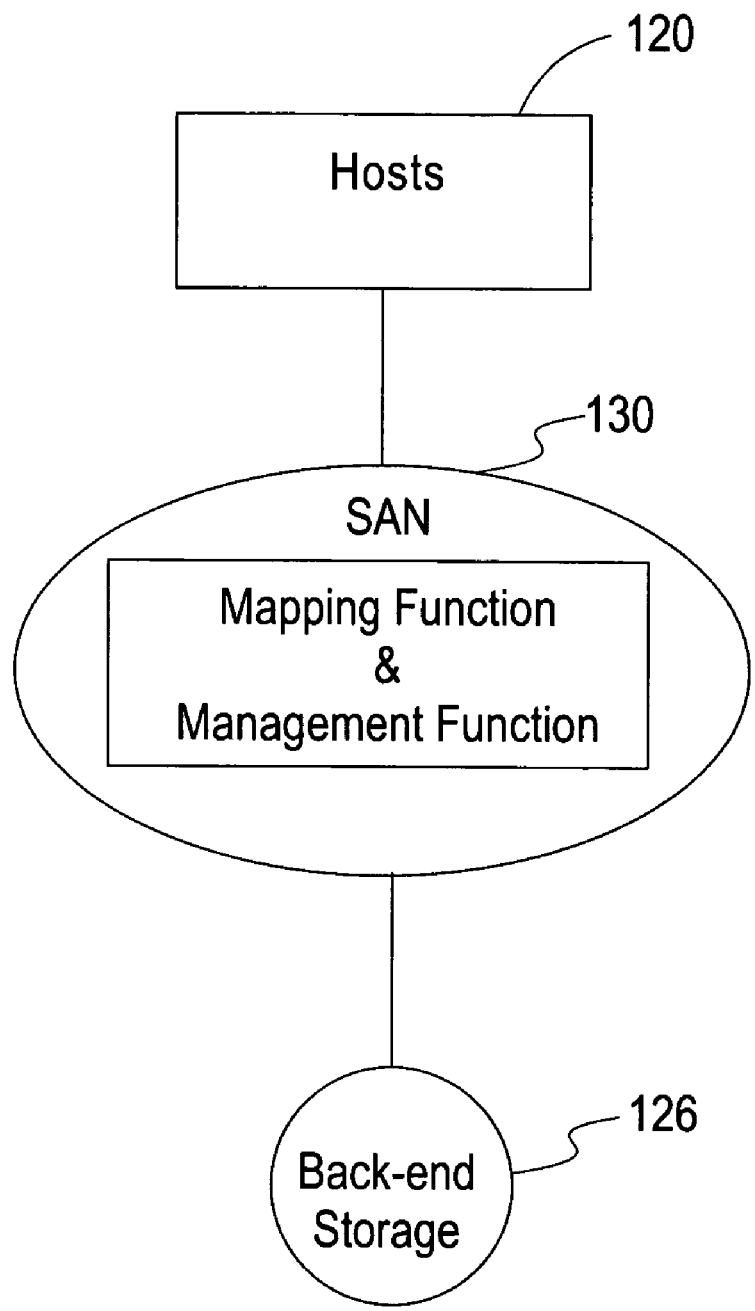
FIG. 2 is a schematic diagram of an in-band virtualization engine.

In FIG. 2, the in-band virtualization engines combine these two functions in a single SAN unit 130, such that read and write data requests are serviced at the same place that configuration requests are serviced. In addition, in-band virtualization engines often process more advanced (e.g., storage management) functions such as fast-write caching that allows write data to be written into the virtualization engine without writing the data all the way to slower storage devices, but maintains the guarantees normally provided by the slower storage devices. Thus, data will be preserved after a hardware error or power failure. More robust and performance oriented implementations include remote copy, point-in-time copy, and transparent data migration. Remote copy allows write data to be mirrored at a remote location so that it will be preserved and accessible after a disaster at the primary location. Point-in-time copy allows an image of a logical unit at a particular point in time to be logically copied to another logical unit, without physically having to perform any copying of the data from one logical unit to another. Transparent data migration is a facility for moving data from one storage device to another. without disturbing host access of that data while it is being moved. These advanced functions require significant amounts of memory, particularly in the case of a fast-write cache that stores the write data, and distributed protocols between virtualization engines, which requires a great deal of complex software and high processing power in the processors within the virtualization engines.

Some problems normally associated with out-of-band virtualization engines are that the advanced functions such as point-in-time copy, remote copy, and transparent data migration, call for significant high latency coordination between the mapping unit 122 and the management unit 124, at the expense of increased latency for those operations. Because the mapping functions are 'thin', they do not offer such features as fast-write cache services that allow hosts to write data without having to wait for data-copying or moving operation from one slow storage device to another to complete. This means that the write latency induced by advanced functions such as point-in-time copy cannot be hidden behind the fast-write cache.

Some problems normally associated with in-band virtualization engines are that users may have some or many of the advanced functions available for some of their data in their current storage controllers and they may not want to purchase the same advanced function again for all their data. There is more costly hardware associated with an in-band virtualization engine of a given capacity, therefore the total system cost may be higher.

Figure 3:
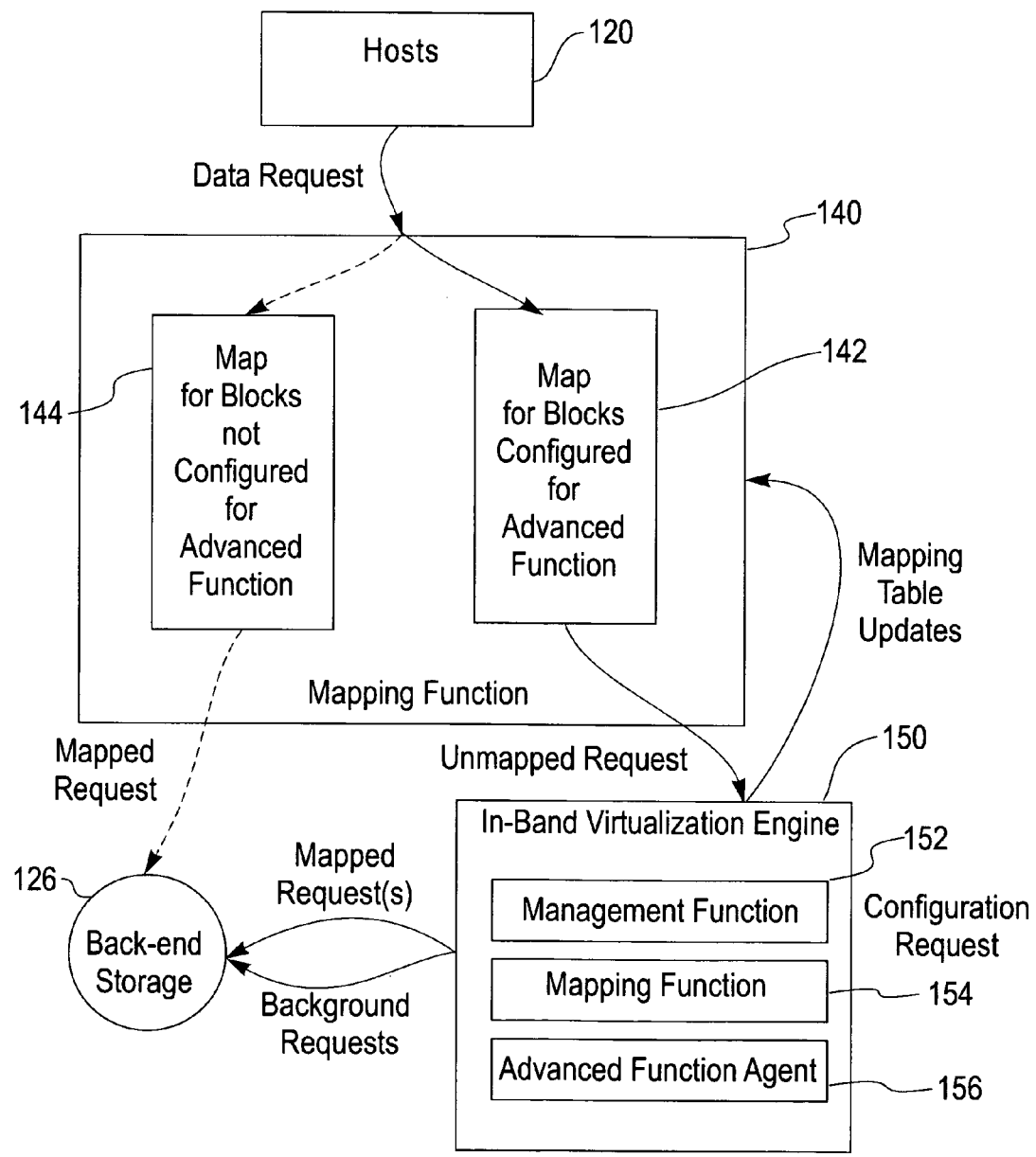
FIG. 3 is a schematic diagram of a hybrid virtualization engine.

One aspect of the invention provides a hybrid virtualization engine which delivers a system that has the advantages of both the in-band and the out-of-band virtualization engines without the disadvantages of either. FIG. 3 shows such a hybrid virtualization engine. In this system, there is, as with an out-of-band virtualization engine, multiple instances of an external mapping unit (function) 140. There is also a management unit (function) 152, an internal mapping unit (function) 154, and an advanced function agent unit 156 within an in-band virtualization engine(s) 150. However, the relationship between the in-band virtualization engines 150 and the external mapping units 140 is much different than either the in-band (FIG. 2) or an out-of-band (FIG. 1) virtualization engines discussed above.

The management unit 152, receives configuration (e.g., to perform storage management functions such as point-in-time copy). In response, the in-band engine 150 updates, in a consistent manner, the internal mapping units 154 of all the in-band virtualization engines and the maps 142, 144 contained within the external mapping units.

Within the external mapping units 140, two devices (e.g., tables) are maintained for each block of data that might be accessed by the host. The first table 144 maps that block of data to the physical location of storage 126. The second table 142 maps the block of data to the in-band virtualization engine 150. For each block of data, a flag (e.g., indicator) is maintained in the external mapping unit 140 to indicate whether the first table 144 should be used to map the request directly to a physical location, or whether the second table 142 should be used to map the request to a virtual location for the in-band virtualization engine. The in-band virtualization engine 150 controls the flag to determine which table 142, 144 will be used to process the data request coming from the host 120. Therefore, the invention allows the in-band virtualization engine 150, acting in response to a configuration instruction, to dynamically control how incoming data requested from the host 120 will be processed by the mapping units 140 by changing the flag in the mapping units 140. The in-band virtualization engine 150 can dynamically direct some or all of the data requests to the storage 126 or some or all of the data requests to the in-band virtualization engine 150.

When a data request is received at the external mapping unit 140 from a host 120, that flag will cause the request to be routed either to the back-end storage 126, or to the in-band virtualization engine 150 which will then perform the storage management function required for that request and in turn will make one or more requests (using mapping unit 154) of the back-end storage 126 to perform the request along with the storage management function.

Figure 4:
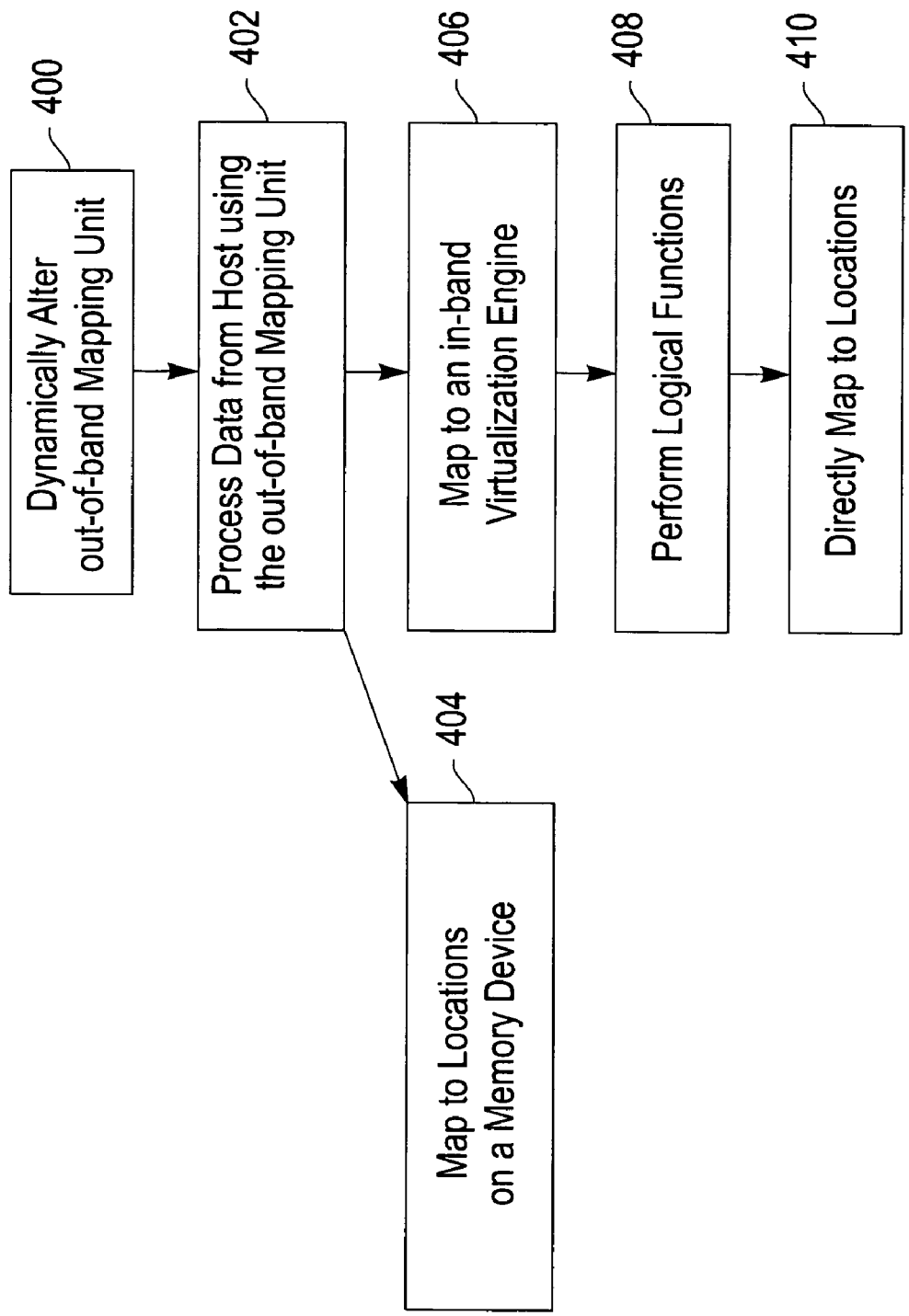
FIG. 4 is a flow diagram illustrating a method of the invention for performing mapping of I/O requests.

FIG. 4 is a flowchart which shows the processing of the invention. In item 400, the invention dynamically alters the out-of-band mapping unit 140. Next, in item 402, the invention processes data from the host 120 using the out-of-band mapping unit 140. The invention then proceeds either to item 404, whereby the invention maps to locations on the memory device 126 using the first table 144; or the invention proceeds to item 406 to map to the in-band virtualization engine 150 using the second table 142. After the invention completes item 406, the invention will perform storage management functions in item 408 using the advanced function (e.g., storage management) agent 156 in the in-band virtualization engine 150. In item 410, the invention directly maps to the memory locations 126 using the mapping unit 154.

Figure 5:
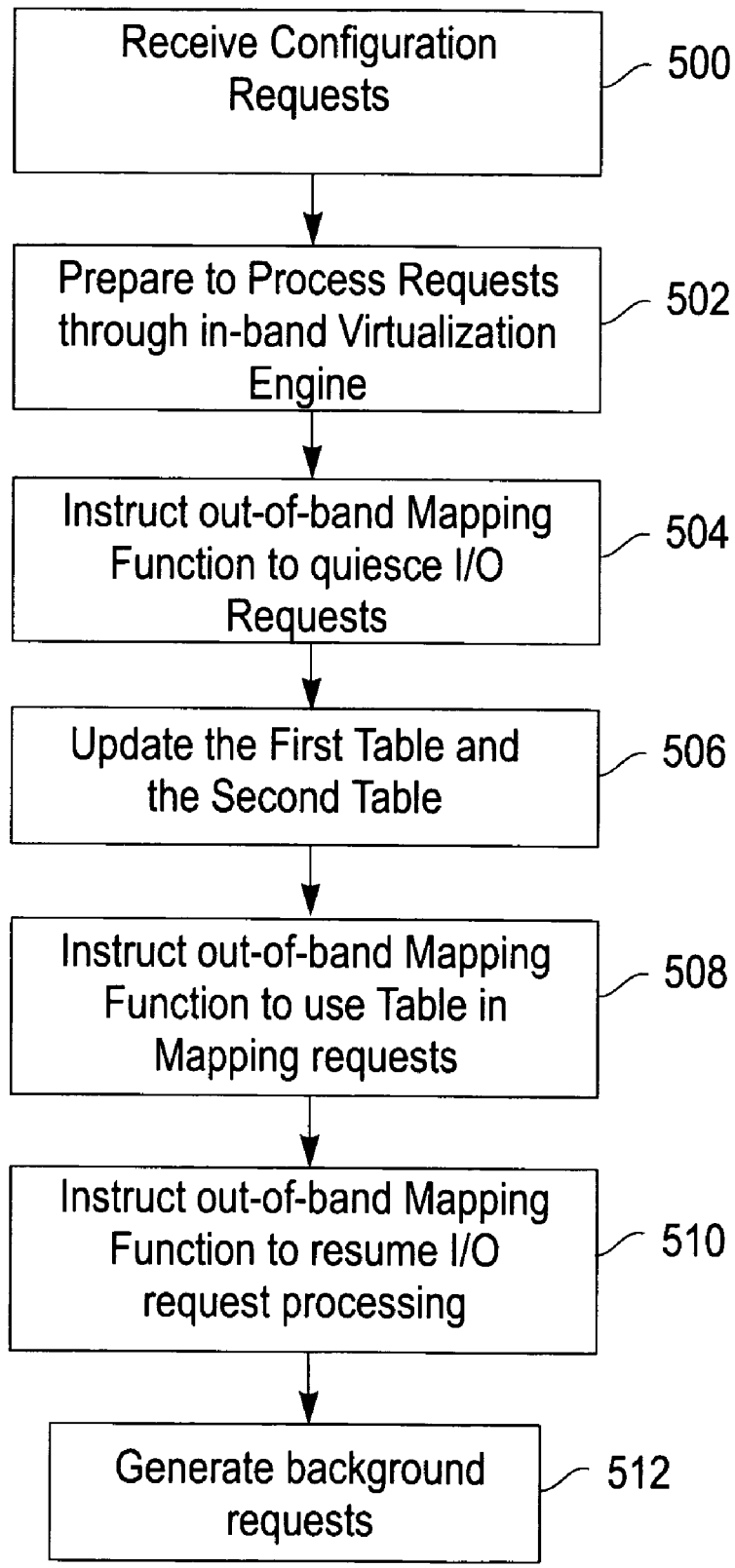
FIG. 5 is a flow diagram illustrating a method of the information for performing configuration requests that alter how the mapping of I/O requests is done.

FIG. 5 is a flowchart which shows the interaction of the in-band virtualization engine 150 and the out-of-band mapping unit 140 in response to a configuration change. With the invention, the configuration change dynamically switches a set of I/O requests for specific virtual disk blocks from going straight from the out-of-band mapping function 140 to back-end storage devices 126, to going from the out-of-band mapping function 140 through the in-band virtualization engine 150. In item 500, configuration requests are received by the management function 152 of the in-band virtualization engine 150. In item 502, the management function 152 prepares to process requests through the in-band virtualization engine 150 by updating the mapping tables in the in-band mapping function 154. In item 504, the management function 152 instructs out-of-band mapping function 140 to quiesce I/O requests for the affected virtual disk blocks. In item 506, the management function 152 updates the first table 144 and the second table 142. In item 508, the management function 152 then instructs out-of-band mapping function 140 to use table 142 in mapping requests for the affected virtual disk blocks. In item 510, the management function 152 finally instructs out-of-band mapping function 140 to resume I/O request processing for the affected virtual disk Optionally, in item 512, the management function 152 generates background requests to read data from one back-end storage device 126 and to write data to another back-end storage device 126, and transmits those requests to back-end storage devices 126 via out-of-band mapping function 140.

Dynamically changing of streams of I/O requests from going through the in-band virtualization engine 150 back to going straight from the out-of-band mapping function 140 to back-end storage devices 126 is accomplished using a similar sequence as described by FIG. 5.

Thus, the advanced function can be dynamically enabled or disabled for sets of blocks. For example, establishing a point-in-time copy will cause the advanced function to be enabled until a background copy is completed (by action of the in-band virtualization engine 150 making background requests of the back-end storage 126), at which point the advanced function would be disabled. The in-band virtualization engine 150 will consistently update its own mapping tables 154 and the mapping tables 142, 144 within the external mapping units 140 for each change. On the other hand, the advanced function could be set relatively statically for certain blocks of data, for example, if a user wanted to enable fast-write cache in the in-band virtualization engine for some of the data.

Thus, the invention provides the advantages of both the in-band and out-of-band virtualization approaches. Potentially most of the data requests go through the relatively inexpensive mapping unit 140 directly to storage 126. However, for that set of data for which advanced function was required or desired, the data requests could go quickly (rather than through a high latency exception route as in the out-of-band virtualization approach) to the in-band virtualization engine 150 where the advanced function will be carried out in a performance optimized way.

In addition, with the invention, a user can provision this system flexibly to achieve cost goals. For a low cost virtualization system or where the user already has high performance back-end storage (e.g., with fast-write cache), relatively inexpensive mapping units 140 could be deployed in most cases whereas relatively few of the in-band virtualization engines 150 might be deployed to handle the management function and the small amount of data requests resulting from advanced functions such as point-in-time copy or remote copy. On the other hand, a user could choose to deploy a significant set of in-band virtualization engines 150 where those engines will then provide high performance fast-write cache for most of the data. The invention provides a common pool of storage from which all data storage space needs for all computer systems can be met. This contrasts with previous generations in which open (e.g., Unix or Windows) computer systems had access to only their own data storage devices (termed direct attach storage), therefore, free storage space under one computer system could be used by that computer system and no other.

The invention provides a single place and method for storage administrator to perform many of their tasks, for example, making block storage available to computer systems, or establishing remote copies or point-in time copies of sets of data.

While the invention has been described in terms of preferred embodiments, those skilled in the art will recognize that the invention can be practiced with modification within the spirit and scope of the appended claims.

What is claimed is:

1. A system for managing logical blocks of storage, said system comprising:
    an out of band mapping unit adapted to process data requests from a host, said out of band mapping unit comprising a first table and a second table; and
    an in band virtualization engine operatively connected to said out of band mapping unit,
    wherein said first table is adapted to map to locations on a memory device,
    wherein said second table is adapted to map to said in band virtualization engine and said in band virtualization engine is adapted to perform storage management functions and directly map to said locations on said memory device,
    wherein said out of band mapping unit further comprises an indicator for choosing between said first table and said second table, and
    wherein said in band virtualization engine is further adapted to update said first table and said second table.

2. The system in claim 1, wherein said storage management functions include fast write caching, remote copy, and point in time copy.

3. The system in claim 1, wherein said in band virtualization engine includes a management unit, an advanced function agent, and a mapping unit.

4. The system in claim 1, wherein said in band virtualization engine is further adapted to process configuration requests from external administrators.

5. The system in claim 1, wherein said in band virtualization engine is further adapted to perform background request processing on said memory device.

6. A system for managing logical blocks of storage, said system comprising:
    an out of band mapping unit adapted to process data requests from a host, said mapping unit comprising a first table and a second table; and
    an in band virtualization engine operatively connected to said out of band mapping unit, wherein:
    said first table is adapted to map to locations on a memory device;
    said second table is adapted to map to said in band virtualization engine;
    said in band virtualization engine is adapted to perform storage management functions and directly map to said locations on said memory device;
    said out of band mapping unit is adapted to be dynamically altered by said in band virtualization engine to determine which of said first table and said second table is chosen;
    said out of band mapping unit further comprises an indicator for choosing between said first table and said second table; and
    said in band virtualization engine is further adapted to update said first table and said second table.

7. The system in claim 6, wherein said storage management functions include fast write caching, remote copy, and point in time copy.

8. The system in claim 6, wherein said in band virtualization engine includes a management unit, an advanced function agent, and a mapping unit.

9. The system in claim 6, wherein said in band virtualization engine is further adapted to process configuration requests from external administrators.

10. The system in claim 6, wherein said in band virtualization engine is further adapted to perform background request processing on said memory device.

11. A method for managing logical blocks of storage, said method comprising:
    processing data requests from a host using an out of band mapping unit having a first table and a second table;
    mapping to locations on a memory device using said first table;
    mapping to an in band virtualization engine using said second table;
    performing storage management functions using said in band virtualization engine;
    directly mapping to said locations on said memory device using said in band virtualization engine; and
    updating said first table and said second table using said in band virtualization engine,
    wherein said dynamically altering of said out of band mapping unit comprises setting an indicator for choosing between said first table and said second table.

12. The method in claim 11, wherein said performing of said storage management functions includes fast write caching, remote copy, and point in time copy using said in band virtualization engine.

13. The method in claim 11, wherein said performing of said storage management functions is performed using a management unit in said in band virtualization engine and said directly mapping is performed using a mapping unit in said in band virtualization engine.

14. The method in claim 11, further comprising processing configuration requests from external administrators using said in band virtualization engine.

15. The method in claim 11, further comprising performing background request processing on said memory device using said in band virtualization engine.

16. A method for managing logical blocks of storage, said method comprising:
    processing data requests from a host using an out of band mapping unit having a first table and a second table;
    mapping to locations on a memory device using said first table;
    mapping to an in band virtualization engine using said second table;
    performing storage management functions using said in band virtualization engine;
    directly mapping to said locations on said memory device using said in band virtualization engine;
    dynamically altering said out of band mapping unit using said in band virtualization engine so as to determine which of said first table and said second table is chosen; and
    updating said first table and said second table using said in band virtualization engine,
    wherein said dynamically altering of said out of band mapping unit comprises setting an indicator for choosing between said first table and said second table.

17. The method in claim 16, wherein said performing of said storage management functions includes fast write caching, remote copy, and point in time copy using said in band virtualization engine.

18. The method in claim 16, wherein said performing of said storage management functions is performed using a management unit in said in band virtualization engine and said directly mapping is performed using a mapping unit in said in band virtualization engine.

19. The method in claim 16, further comprising processing configuration requests from external administrators using said in band virtualization engine.

20. The method in claim 16, further comprising performing background request processing on said memory device using said in band virtualization engine.

* * * * *